C. J. SYME.
CHURN-DASHER.

No. 186,897.  Patented Jan. 30, 1877.

Witnesses:  Inventor:
Chapman J. Syme

UNITED STATES PATENT OFFICE.

CHAPMAN J. SYME, OF PETERSBURG, VIRGINIA, ASSIGNOR TO HIMSELF AND PETER T. YOUNG, OF SAME PLACE.

IMPROVEMENT IN CHURN-DASHERS.

Specification forming part of Letters Patent No. 186,897, dated January 30, 1877; application filed August 3, 1876.

*To all whom it may concern:*

Be it known that I, CHAPMAN J. SYME, of Petersburg, in the county of Dinwiddie and State of Virginia, have invented a new and Improved Churn-Dasher; and I do hereby declare that the following is a full, clear, and exact description of the same, reference being had to the accompanying drawing, forming part of this specification, in which—

Figure 2:
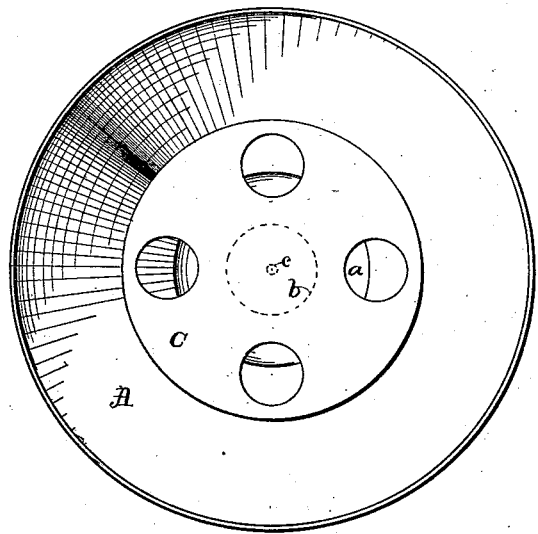
Figure 1:
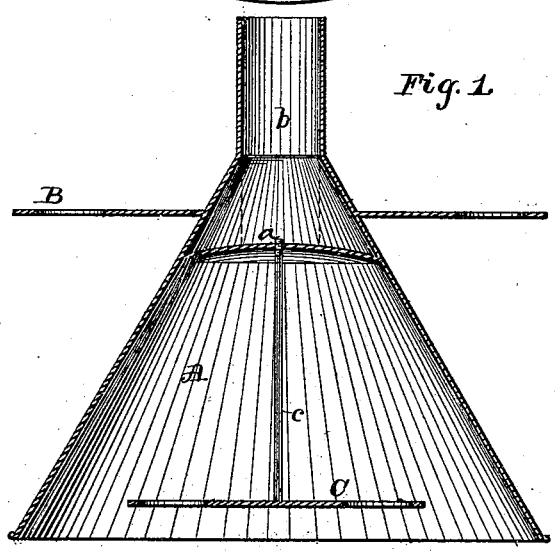

Figure 1 is a vertical section. Fig. 2 is an inverted plan view.

My invention relates to certain improvements in churn-dashers, designed to churn the butter more rapidly by producing a large degree of agitation in the cream. It consists in the particular construction and arrangement of a conical or funnel shaped dasher, having a socket to receive the handle, and provided with a perforated plate near its apex, upon the outside, and a second perforated plate attached to a rod upon the outside, all as hereinafter more fully described.

In the accompanying drawing, A represents a conical or funnel shaped dasher, constructed preferably of sheet metal. Said conical dasher is closed near its apex by a partition, $a$, and terminates in a socket, $b$, adapted to receive the wooden staff constituting the handle.

The said partition $a$ is rounded upon the under side, and while it serves to facilitate the cleansing of the dasher by closing up an otherwise inaccessible recess, it also gives a deep socket for the staff-handle, so as to make a more secure connection therewith than the short socket would otherwise give.

B is a perforated plate attached to the outside of the cone near the apex. This plate is preferably of sheet metal and circular in shape, and its function is as follows: When the conical-shaped dasher is suddenly depressed, there is immediately a large displacement of cream, which quickly closes in around the apex, and would, without the plate B, soon regain its equilibrium and comparative rest; but, as the cream thus closes in, it is met by the plate B with an impact, which, together with the passage of the cream through the perforations, facilitates the breaking up of the butter-globules, and correspondingly improves the operation of the dasher.

C is the second perforated plate contained inside of the cone A. This plate is mounted upon a rod, $c$, attached centrally to the piece $a$, and is detachably fastened to the said rod by means of a screw-thread, so that it may be readily removed to facilitate cleaning. The function of this plate, in connection with the conical dasher, is as follows: When the dasher is reciprocated the cream in the conical part is alternately under a pressure, and subject to a partial vacuum.

Upon the descent of the plunger the cream, in surging up toward the apex, is violently agitated by the said plate during the increased pressure, and after the dasher is elevated, a portion of the cream is carried up by the partial vacuum for a short distance, when it falls around and through the plate C, thus producing a double agitation.

From the construction of the dasher, as hereinbefore described, it will be seen that a large degree of agitation is effected, not only through the direct reciprocation of the dasher, but the reaction of the cream consequent thereupon is utilized to prolong the said agitation, so that the cream is not only agitated when the dasher is in motion, but also at the ends of the stroke, when the dasher is, for an instant, at rest. This greater degree of agitation more effectually breaks up the butter-globules, producing a proportionately larger amount of butter, and the churning is more quickly effected. The conical shape of the dasher A, moreover, causes the butter-particles to gather into a lump, while the partition $a$ and detachable character of plate C permit the ready cleansing of the device.

Having thus described my invention, what I claim as new is—

The conical dasher A, having socket $b$, partition $a$, and rod $c$, in combination with the perforated plate B, located upon the outside of the dasher A, near the apex, and the perforated plate C, detachably mounted upon the rod $c$, inside the dasher A, substantially as and for the purpose described.

CHAPMAN J. SYME.

Witnesses:
F. R. RUSSELL,
J. N. RUSSELL.